(12) United States Patent
Imai et al.

(10) Patent No.: US 8,809,457 B2
(45) Date of Patent: Aug. 19, 2014

(54) ADHESIVE COMPOSITION, ADHESIVE FILM, AND METHOD FOR TREATING SUBSTRATE

(71) Applicant: Tokyo Ohka Kogyo Co., Ltd., Kawasaki (JP)

(72) Inventors: Hirofumi Imai, Kawasaki (JP); Koki Tamura, Kawasaki (JP); Atsushi Kubo, Kawasaki (JP); Takahiro Yoshioka, Kawasaki (JP)

(73) Assignee: Tokyo Ohka Kogyo Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/628,989

(22) Filed: Sep. 27, 2012

(65) Prior Publication Data

US 2013/0081760 A1 Apr. 4, 2013

(30) Foreign Application Priority Data

Sep. 30, 2011 (JP) .................. 2011-218070
Mar. 19, 2012 (JP) .................. 2012-062145

(51) Int. Cl.
*C08L 53/00* (2006.01)
*C09B 67/00* (2006.01)
*C09J 7/02* (2006.01)
*C09J 153/02* (2006.01)

(52) U.S. Cl.
CPC ...... *C09J 7/0221* (2013.01); *C09J 7/02* (2013.01); *C09J 153/02* (2013.01)
USPC .......................... 525/89; 524/502

(58) Field of Classification Search
USPC .......................... 524/502; 525/89
See application file for complete search history.

(56) References Cited

U.S. PATENT DOCUMENTS

| | | | |
|---|---|---|---|
| 3,640,977 | A | 2/1972 | Gonzenbach et al. |
| 5,059,487 | A | 10/1991 | Muro |
| 5,888,703 | A | 3/1999 | Tomo |
| 6,255,396 | B1 | 7/2001 | Ding et al. |
| 7,015,276 | B2 | 3/2006 | Morita et al. |
| 7,186,448 | B2 | 3/2007 | Yokoyama |
| 8,298,365 | B2 | 10/2012 | Imai et al. |
| 2004/0039122 | A1 | 2/2004 | Morita et al. |
| 2007/0185310 | A1 | 8/2007 | Moore et al. |
| 2008/0173970 | A1 | 7/2008 | Pillalamarri |
| 2008/0200011 | A1 | 8/2008 | Pillalamarri et al. |
| 2008/0281037 | A1 | 11/2008 | Karjala |
| 2008/0306207 | A1 | 12/2008 | Moore et al. |
| 2009/0280318 | A1 | 11/2009 | Matsugi |
| 2010/0069593 | A1 | 3/2010 | Asai et al. |
| 2010/0086799 | A1 | 4/2010 | Asai et al. |
| 2010/0206479 | A1 | 8/2010 | Pillalamarri et al. |
| 2010/0280179 | A1* | 11/2010 | Uno et al. .......... 525/89 |
| 2011/0086955 | A1 | 4/2011 | Hong et al. |
| 2012/0083561 | A1 | 4/2012 | Imai et al. |

FOREIGN PATENT DOCUMENTS

| | | |
|---|---|---|
| EP | 0995784 | 4/2000 |
| JP | 50-76144 | 6/1975 |
| JP | 05-279554 | 10/1993 |
| JP | 07-224270 | 8/1995 |
| JP | 08-092441 | 4/1996 |
| JP | 09-157628 | 6/1997 |
| JP | 11-269394 | 10/1999 |
| JP | 2000-304920 | 11/2000 |
| JP | 2000-327878 | 11/2000 |
| JP | 2001-187874 | 7/2001 |
| JP | 2001-279208 | 10/2001 |
| JP | 2003-3048 | 1/2003 |
| JP | 2003-173993 | 6/2003 |
| JP | 2008-133405 | 6/2008 |
| JP | A-2008-214365 | 9/2008 |
| JP | 2009-529065 | 8/2009 |
| JP | 2010-506406 | 2/2010 |
| JP | 2010-109324 | 5/2010 |
| WO | WO 2008/045669 | 4/2008 |

OTHER PUBLICATIONS

Office Action issued on Jun. 13, 2013 in U.S. Appl. No. 13/240,415.
Office Action issued on Apr. 10, 2013 in U.S. Appl. No. 13/157,568.
Wallow et al., "Low-distortion, high-strength bonding of thermoplastic microfluidic devices employing case-II diffusion mediated permeant activation," The Royal Society of Chemistry, Lab Chip, vol. 7, pp. 1825-1831, Sep. 19, 2007.
Advisory Action issued on Jun. 18, 2013 in U.S. Appl. No. 13/157,568.
International Search Report issued in International Paten Application No. PCT/JP2010/058558 issued on Jul. 20, 2010.
Office Action issued on May 25, 2012 in U.S. Appl. No. 13/157,568.
Office Action issued on Nov. 8, 2012 in U.S. Appl. No. 13/157,568.
Office Action issued on Dec. 21, 2012 in U.S. Appl. No. 13/157,568.
Hawley's Condensed Chemical Dictionary, Definition of Condensation, 2002, John Wiley & Sons, Inc., 14th Edition.
Office Action issued on Jan. 22, 2014 in U.S. Appl. No. 13/240,415.
Final Office Action issued on Oct. 31, 2013 in U.S. Appl. No. 13/240,415.
Zwenger et al., "Plant terpenoids: applications and future potentials," *Biotechnology and Molecular Biology Reviews*, 3(1): 001-007, (Feb. 2008).
Office Action mailed May 14, 2014 in U.S. Appl. No. 13/240,415.

* cited by examiner

*Primary Examiner* — Angela C Scott
(74) *Attorney, Agent, or Firm* — Knobbe Martens Olson & Bear LLP

(57) ABSTRACT

An adhesive composition including a hydrocarbon resin, a modified elastomer that is bonded with at least one functional group-containing atom group, and a solvent.

17 Claims, No Drawings

ADHESIVE COMPOSITION, ADHESIVE FILM, AND METHOD FOR TREATING SUBSTRATE

This application claims priority under 35 U.S.C. §119(a)-(d) to Japanese Patent Application No. 2012-062145, filed on Mar. 19, 2012; and Japanese Patent Application No. 2011-218070, filed Sep. 30, 2011, the entire contents of which are hereby incorporated herein by reference.

TECHNICAL FIELD

The present invention relates to an adhesive composition, an adhesive film, and a method for treating a substrate by use of the adhesive composition.

BACKGROUND ART

Products such as mobile telephones, digital AV equipment, IC cards, and the like have been improved to have more sophisticated functions. This gives rise to an increase in a demand that semiconductor silicon chips (hereinafter referred to as chips) provided in the products are downsized and thinned so that silicon can be provided with higher density in a package. For example, for an integrated circuit in which a plurality of chips are provided in one package, such as a CSP (chip size package) or an MCP (multi-chip package), there is a demand that the chips are thinned. In order to provide the chips with higher density in the package, it is necessary to thin the chips to a thickness in a range of 25 μm to 150 μm.

By a grinding process, semiconductor wafers (hereinafter referred to as wafers) which serve as bases for the respective chips are thinned. This, however, weakens strengths of the wafers. With the strengths of the wafers being weakened, it is easy that cracks or curls are formed in the wafer. Further, the wafers thus weakened in strength by the thinning are difficult to transfer with an automatic transporting process and need to be carried manually. As understood from this, handling of the wafers is troublesome.

As a countermeasure, a wafer handling system is developed which adds strengths to the wafers. According to the wafer handling system, a plate called a support plate, which is made from glass, rigid glass, or the like, is attached to the wafers to be thinned so that the wafers are protected from being cracked or curled. Because the strengths of the wafers can be thus secured by the wafer handling system, it is possible to automatically transport the wafers after the thinning process.

In the wafer handling system, the wafers and the support plate are attached to each other by use of an adhesive tape, a thermoplastic resin, an adhesive agent, or the like. Then, the wafers to which the support plate is attached are thinned. After this, the support plate is removed from a substrate before the wafers are diced. Specifically, in a case where the wafer and the support plate are attached to each other with the use of the adhesive agent, the wafers are removed from the support plate by dissolving the adhesive agent.

As the adhesive agent, hydrocarbon-based adhesive agents have been developed in recent years (see Patent Literatures 1 and 2).

CITATION LIST

Patent Literature 1
Japanese Translation of PCT international publication, Tokuhyo, No. 2009-529065 A (Publication Date: Aug. 13, 2009)

Patent Literature 2
Japanese Translation of PCT international publication, Tokuhyo, No. 2010-506406 A (Publication Date: Feb. 25, 2010)

SUMMARY OF THE INVENTION

Technical Problem

However, the hydrocarbon-based adhesive agents of the conventional arts have poor flexibilities and poor adhesivenesses (followability) to substrate interfaces. As such, laminates prepared by use of the hydrocarbon adhesive resin of the conventional arts have a risk that when pressure are applied on the laminates in a process such as a heat process, a grinding process, and interfacial peeling occurs in the laminates.

In view of this, there is a demand that an adhesive composition is developed which has flexibility and good adhesiveness to a substrate interface.

The present invention is made in view of the problem, and a main object of the present invention is to provide an adhesive composition having flexibility and good adhesiveness to a substrate interface.

Solution to Problem

An adhesive composition of the present invention includes: a hydrocarbon resin; a modified elastomer that is bonded with at least one atom group that is a functional group-containing atom group; and a solvent.

Advantageous Effects of the Invention

The present invention can provide an adhesive composition having flexibility and good adhesiveness to a substrate interface.

DETAILED DESCRIPTION OF THE PREFERRED EMBODIMENTS

Adhesive Composition

An adhesive composition of the present invention includes a hydrocarbon resin, a modified elastomer that is bonded with an least one atom group that is a functional group-containing atom group, and a solvent.

Use of the adhesive composition of the present invention is not particularly limited. For example, the adhesive composition of the present invention can be used by a process of manufacturing a semiconductor wafer (hereinafter, simply referred to as a wafer). Particularly, the adhesive composition of the present invention can be preferably used to temporarily adhere the wafer to a support substrate (hereinafter referred to as a support plate) so that the wafer is protected from being damaged and contaminated after a thinning process.

Hydrocarbon Resin

A hydrocarbon resin is a resin having a hydrocarbon backbone and produced by polymerizing a monomer component(s). For example, the hydrocarbon resin is a cycloolefin polymer (hereinafter, also referred to as a "resin A") or at least one resin (hereinafter, also referred to as a "resin B") selected from the group consisting of a terpene-based resin, a rosin-based resin, and a petroleum-based resin.

The cycloolefin polymer is a resin produced by polymerizing cycloolefin monomers as monomer components. For example, the cycloolefin monomers are (i) bicyclic compounds such as norbornene, norbornadiene, or the like, (ii) tricyclic compounds such as dicyclopentadiene, hydroxy dicyclopentadiene, or the like, (iii) tetracyclic compounds such as tetracyclododecene and or like, (iv) pentacyclic compounds such as cyclopentadiene trimer or the like, (v) heptacyclic compounds such as tetracyclopentadiene or the like, (vi) alkyl- (methyl-, ethyl-, propyl-, butyl-, or the like) substituted derivatives of the polycyclic compounds (i) to (v), (vii) alkenyl-vinyl- or the like) substituted derivatives of the polycyclic compounds (i) to (v), (viii) alkylidene- (ethylidene- or the like) substituted derivatives of the polycyclic compounds (i) to (v), (x) aryl- (phenyl-, tolyl-, naphthyl, or the like) substituted derivatives of the polycyclic compounds (i) to (v), or the like. The resin (A) can be a polymer of one of these cycloolefin monomers or a copolymer of two or more of the cycloolefin monomers.

The monomer component(s) included in the resin (A) is not limited to the cycloolefin monomer(s) and can include a monomer being other than the cycloolefin monomer(s) and copolymerizable with the cycloolefin monomer(s). For example, the monomer other than the cycloolefin monomer(s) is a linear alkene monomer or a branched-chain alkene monomer. The linear alkene monomer or the branched-chain alkene monomer is an α-olefin such as ethylene, propylene, 1-butene, isobutene, 1-hexene, or the like. One alkene monomer or a combination of two or more alkene monomers may be used.

The resin (A) is not particularly limited in a molecular weight. For example, a weight-average molecular weight (Mw) of the resin (A), which is measured by a gel permeation chromatography (GPC) based on polystyrene, is in a range of 50,000 to 200,000 and more preferably in a range of 50,000 to 150,000. In a case where the weight-average molecular weight of the resin (A) is set within either range, a crack rarely occurs in a layer formed from the resin (A) and the resin (A) can have a dissolubility to a specific solvent.

From a perspective of a large heat resistance (low pyrolytic property and low heating weight loss property), it is preferable that 5 mol % or more of the monomer component(s) of the resin (A) is a cycloolefin monomer, it is more preferable that 10 mol % or more of the monomer component(s) of the resin (A) is a cycloolefin monomer, and it is further preferable that 20 mol % or more of the monomer component(s) of the resin (A) is a cycloolefin monomer. A cycloolefin monomer content in the monomer component(s) of the resin (A) is not particularly limited in an upper limit. From a perspective of dissolubility and temporal stability in a solution, it is preferable that not more than 80% of the monomer component(s) of the resin (A) is a cycloolefin monomer, and it is more preferable that not more than 70% of the monomer component(s) of the resin (A) is a cycloolefin monomer. From perspectives of dissolubility and flexibility, in a case where the resin (A) contains a linear or branched alkene monomer a monomer other than the cycloolefin monomer, a content of the linear or branched alkene monomer is preferably in a range of 10 mol % to 90 mol % with respect to a content of the monomer component(s) of the resin (A), more preferably in a range of 20 mol % to 85 mol % with respect to the content of the whole monomer component(s) of the resin (A), and particularly preferably in a range of 30 mol % to 80 mol % with respect to the content of the whole monomer component(s) of the resin (A).

Polymerization of the monomer component(s) of the resin (A) is not particularly limited in a polymerization method and a polymerization condition. As such, the monomer component(s) of the resin (A) can be polymerized by use of a conventional and known method.

Commercial products which can be used as the resin (A) are described below. For example, the commercial products are "APEL (product name)" manufactured by Mistui Chemicals Inc., "TOPAS (product name)" manufactured by Polyplastics Co. Ltd., "ZEONOR (product name)" and "ZEONEX (product name)" manufactured by ZEON CORPORATION, and "ARTON (product name)" manufactured by JSR Corporation.

As described earlier, the resin (B) is at least one resin selected from the group consisting of the terpene-based resin, the rosin-based resin, and the petroleum-based resin. For example, the terpene-based resin is a terpene resin, a terpene phenol resin, a modified terpene resin, a hydrogenerated terpene resin, a hydrogenated terpene phenol resin, or the like. For example, the rosin-based resin is rosin, a rosin ester, hydrogenated rosin, a hydrogenated rosin ester, polymerized rosin, a polymerized rosin ester, modified rosin, or the like. For example, the petroleum-based resin is an aliphatic petroleum resin, an aromatic petroleum resin, a hydrogenerated petroleum resin, a modified petroleum resin, an alicyclic petroleum resin, a malon indene petroleum resin, or the like. Among them, particularly, the hydrogenerated terpene resin and the hydrogenerated terpene phenol resin are preferable.

The resin (B) is not particularly limited in a molecular weight. For example, a weight-average molecular weight (Mw) of the resin (B), which is measured by measuring a polystyrene reduced value by GPC, is in a range of 300 to 10,000 and more preferably in a range of 500 to 5,000. In a case where the weight-average molecular weight of the resin (B) is set within either range, a crack rarely occurs after layer formation and a large heat resistance property (a pyrolysis resistance property and a sublimation resistance property).

The resins (A) and (B) may be used in combination. In this case, a content of the resin (A) is preferably 40 parts by weight or more, more preferably 60 parts by weight or more, with respect to the weight of the entire hydrocarbon resin. In a case where the content of the resin (A) is set to 40 parts by weight or more with respect to the weight of the entire hydrocarbon resin, it is possible to obtain both a flexibility and a large heat resistance (low pyrolytic property).

Modified Elastomer

The modified elastomer of the present invention is an elastomer to which at least one functional group-containing atom group is bonded. For example, the modified elastomer of the present invention can be obtained by bonding at least one functional group-containing atom group to a known elastomer by use of a modifying agent.

The functional group-containing atom group is an atom group including one or more functional groups. For example, the one or more functional groups included in the functional group-containing atom group of the present invention are an amino group, an acid anhydride group (which is preferably a maleic anhydride group), an imido group, a urethane group, an epoxy group, an imino group, a hydroxyl group, a carboxyl group, a silanol group, and/or an alkoxysilane group (it is preferable that the alkoxysilane group is a C1 to C6 alkoxysilane group).

The elastomer, which is to be modified to the modified elastomer of the present invention, can be selected from various elastomers. For example, the elastomer is (i) a styrene-isoprene-styrene block copolymer (SIS), (ii) a styrene-butadiene-styrene block copolymer (SBS), (iii) a styrene-butadiene-butylene-styrene block copolymer (SBBS), (iv) an ethylene-propylene terpolymer (EPT), (v) any of hydrogenerates of (i) through (iv), (vi) a styrene-ethylene-butylenestyrene block copolymer (SEBS), (vii) a styrene-ethylene-propylene-styrene block copolymer (styrene-isoprene-styrene block copolymer) (SEPS), (viii) a styrene-ethylene-ethylene-propylene-styrene block copolymer (SEEPS), or the like. Particularly, a hydrogenate of a block copolymer of vinyl aromatic hydrocarbon and conjugated diene can be suitably used.

A commercially-available product which can be used as the modified elastomer is, for example, "Tuftec (product name)" manufactured by Asahi Kasei Corporation, "SEPTON (product name)" and "HYBRAR (product name)" manufactured by KURARAY Co., Ltd, "DYNARON (product name)" manufactured by JSR Corporation, or the like.

The modified elastomer is thus the elastomer to which the one or more functional groups which have polar properties are bonded. Therefore, the modified elastomer contained in the adhesive composition of the present invention improves flexibility and adhesiveness of the adhesive composition of the present invention.

A typical elastomer has a poor heat resistance property. Considering this, in a case where the adhesive composition is used in the heat process, it is preferable to adjust the content of the modified elastomer in the adhesive composition so as to prevent the modified elastomer from hindering an appropriate heat resistance property of the adhesive composition.

In one embodiment, the adhesive composition of the present invention includes the modified elastomer in such an amount that the content of the modified elastomer is preferably in a range from 0.1 part by weight or more to 20 parts by weight or less with respect to 100 parts by weight of the hydrocarbon resin, particularly preferably in a range from 1 part by weight or more to 15 parts by weight or less with respect to 100 parts by weight of the hydrocarbon resin, and most preferably in a range from 1 part by weight or more to 10 parts by weight or less with respect to 100 parts by weight of the hydrocarbon resin. In a case where the content of the modified elastomer is set within either range, it is possible to prevent the modified elastomer from hindering the heat resistance property of the adhesive composition.

Solvent

The solvent is not limited as long as it can dissolve the hydrocarbon resin and the modified elastomer. For example, the solvent can be a nonpolar hydrocarbon-based solvent, a polar petroleum-based solvent, an apolar petroleum-based solvent, or the like.

Preferably, the solvent may contain condensed polycyclic hydrocarbon. The condensed polycyclic hydrocarbon contained in the solvent can prevent clouding of the solvent when the solvent is stored in a liquid form (particularly at a low temperature). This can improve product stability.

The hydrocarbon-based solvent can be a linear, branched, or cyclic hydrocarbon. Examples of the hydrocarbon solvent encompass (i) linear hydrocarbons such as hexane, heptane, octane, nonane, methyloctane, decane, undecane, dodecane, tridecane, and the like, (ii) C3 to C15 branched hydrocarbons, and (iii) cyclic hydrocarbon such as p-mentane, o-mentane, m-mentane, diphenyl mentane, α-terpinene, β-terpinene, γ-terpinene, 1,4-terpine, 1,8-terpine, bornane, norbornane, pinane, α-pinene, β-pinene, thujane, α-thujone, β-thujone, carane, or longifolene, and the like.

Examples of the petroleum-based solvent encompass cyclohexane, cycloheptane, cyclooctane, naphthalene, decahydronaphthalene, tetrahydronaphthalene, and the like.

The condensed polycyclic hydrocarbon is condensed ring hydrocarbon in which two or more monocycles are fused with each other by commonly sharing one side thereof only. It is preferable that the condensed polycyclic hydrocarbon is hydrocarbon in which two monocycles are fused with each other.

Examples of the condensed ring hydrocarbon encompass hydrocarbon in which a five-membered ring and a six-membered ring are fused with each other and hydrocarbon in which two six-membered rings are fused with each other. Examples of hydrocarbon in which the five-membered ring and the six-membered ring are fused with each other encompass indene, pentalene, indane, tetrahydroindene, and the like. Examples of the hydrocarbon in which the two six-membered rings are fused with each other encompass naphthalene, tetrahydronaphthalene (tetralin), decahydronaphthalene (dekalin), and the like.

In a case where the solvent contains the condensed polycyclic hydrocarbon, a component contained in the solvent can be only the condensed polycyclic hydrocarbon or can include a different component such as, for example, saturated aliphatic hydrocarbon and/or the like. In either case, a content of the condensed polycyclic hydrocarbon is preferably 40 parts by weight or more and more preferably 60 parts by weight or more with respect to a weigh of the entire hydrocarbon solvent. In a case where the content of the condensed polycyclic hydrocarbon is 40 parts by weight or more with respect to the weight of the entire hydrocarbon solvent, it is possible to obtain a high dissolubility for the resin. In a case where a mixture of the condensed polycyclic hydrocarbon and the saturated aliphatic hydrocarbon is used and a ratio of the condensed polycyclic hydrocarbon and the saturated aliphatic hydrocarbon is controlled within either of the above content range, it is possible to moderate an odor of the condensed polycyclic hydrocarbon.

Examples of the saturated aliphatic hydrocarbon encompass (i) linear hydrocarbons such as hexane, heptane, octane, nonane, methyloctane, decane, undecane, dodecane, tridecane, and the like, (ii) branched C3 to C15 hydrocarbons, and (iii) cyclic hydrocarbon such as p-mentane, o-mentane, m-mentane, diphenyl mentane, 1,4-terpine, 1,8-terpine, bornane, norbornane, pinane, thujane, carane, longifolene, and the like.

A content of the solvent in the adhesive composition of the present invention is adjusted as appropriate in accordance with a thickness of the adhesive layer which is formed by use of the adhesive composition. For example, if a weight of the hydrocarbon resin is 100 parts by weight, then it is preferable that the content of the solvent is in a range from 100 parts by weight or more to 2,000 parts by weight or less. In a case where the content of the solvent is controlled within the range, it is possible to easily carry out viscosity control.

Thermal Polymerization Inhibitor

In the present invention, the adhesive composition can contain a thermal polymerization inhibitor. The thermal polymerization inhibitor has a function to inhibit a radical polymerization reaction induced by heating. Specifically, because the thermal polymerization inhibitor has a high reactivity to a radical, reaction between the thermal polymerization inhibitor and the radical predominates reaction between the monomers, thereby inhibiting polymerization of the monomers. Therefore, in the adhesive composition in which the thermal polymerization inhibitor is contained, a polymerization reaction is inhibited under a high temperature condition (particularly, at a temperature in a range from 250° C. to 350° C.).

In a manufacturing process of a semiconductor, for example, there is a high-temperature process in which the wafer to which the support plate is adhered is heated at a temperature of 250° C. for 1 hour. If a polymerization reaction occurs in the adhesive composition by the high temperature during the high temperature process, the polymerization result in a decrease in dissolubility of the adhesive composition with respect to a stripping solution which is used to strip the support plate from the wafer after the high temperature process. This makes it impossible to suitably strip the support plate from the wafer. In contrast, in the adhesive composition of the present invention in which the thermal polymerization inhibitor is contained, heat-induced oxidation is prevented so that no polymerization reaction occurs. As such, even after the high temperature process, it is still possible to easily strip the support plate from the wafer and thereby prevent a residue.

The thermal polymerization inhibitor is not particularly limited as long as it is effective in preventing heat-induced radical polymerization reaction. It is preferable that the thermal polymerization inhibitor is a thermal polymerization inhibitor containing phenol. By use of the thermal polymerization inhibitor containing phenol, it is possible to maintain a good dissolubility even after the high temperature process is carried out under an atmosphere pressure. The thermal polymerization inhibitor containing phenol can be a hindered phenol-based antioxidant. For example, the thermal polymerization inhibitor containing phenol can be pyrogallol, benzoquinone, hydroquinone, methylene blue, tert-butylcatechol, monobenzyl ether, methylhydroquinone, amylquinone, amyloxyhydroquinone, n-butylphenol, phenol, hydroquinone monopropyl ether, 4,4'-(1-methylethylidene)bis(2-methylphenol), 4,4'-(1-methylethylidene)bis(2,6-dimethylphenol), 4,4'-{1-[4-(1-(4-hydroxyphenyl)-1-methylethyl)phenyl]ethylidene}bisphenol, 4,4',4"-ethylidenetris(2-methylphenol), 4,4',4"-ethylidenetrisphenol, 1,1,3-tris(2,5-dimethyl-4-hydroxyphenyl)-3-phenylpropane, 2,6-di-tert-butyl-4-methylphenol, 2,2'-methylenebis(4-methyl-6-tert-butylphenol),4,4'-butylidenebis(3-methyl-6-tert-butylphenol), 4,4'-thiobis(3-methyl-6-tert-butylphenol), 3,9-bis[2-(3-(3-tert-butyl-4-hydroxy-5-methylphenyl)-propionyloxy)-1,1-dimethylethyl]-2,4,8,10-tetraoxasipiro(5,5)undecane, triethyleneglycol-bis-3-(3-tert-butyl-4-hydroxy-5-methylphenyl)propionate, n-octyl-3-(3,5-di-tert-butyl-4-hydroxyphenyl)propionate, penta-erythrityl-tetrakis-[3-(3,5-di-tert-butyl-4-hydroxyphenyl)propionate] (product name: IRGANOX1010, manufactured by Chiba JAPAN Co., Ltd.), tris(3,5-di-tert-butylhydroxybenzil)isocyanurate, or thiodiethylenebis[3-(3,5-di-tert-butyl-4-hydroxyphenyl)propionate]. The thermal polymerization inhibitor can be one thermal polymerization inhibitor or a combination of two or more thermal polymerization inhibitors.

A content of the thermal polymerization inhibitor is determined as appropriate in accordance with (i) a type of the hydrocarbon resin, (ii) use of the adhesive composition, and (iii) an environment in which the adhesive composition is used. For example, if a content of the hydrocarbon resin is 100 parts by weight, then it is preferable that the content of the thermal polymerization inhibitor is in a range from 0.1 part by weight or more to 10 parts by weight or less. In a case where the content of the thermal polymerization inhibitor is set within the range, it is possible to obtain a suitable thermal polymerization inhibition effect. This can further reduce the decrease in the adhesive composition's dissolubility in the stripping solution used after the high-temperature process.

The adhesive composition of the present invention can contain an entrainer in which the thermal polymerization inhibitor is dissolved and whose composition is different from a composition of the solvent in which the hydrocarbon resin is dissolved. The entrainer is not particularly limited and can be an organic solvent in which components included in the adhesive composition are dissolved.

For example, the organic solvent may be one organic solvent or a combination of two or more organic solvents, provided that the organic solvent can dissolve the components of the adhesive composition so as to produce a uniform solution.

A concrete example of the organic solvent encompasses a terpene solvent including an oxygen atom, a carbonyl group, an acetoxy group, or the like as a polar group. For example, the organic solvent can be geraniol, nerol, linalool, citral, citronellol, menthol, isomenthol, neomenthol, α-terpineol, β-terpineol, γ-terpineol, terpinene-1-ol, terpinene-4-ol, dihydroterpinylacetate, 1,4-cineol, 1,8-cineol, borneol, carvone, ionone, thujone, or camphor. Alternatively, the organic solvent can be (i) lactone such as γ-butyrolactone or the like, (ii) ketone such as acetone, methylethylketone, cyclohexanone (CH), methyl-n-pentylketone, methylisopentylketone, 2-heptanone, or the like, (iii) polyalcohol such as ethyleneglycol, diethyleneglycol, propyleneglycol, dipropyleneglycol, or the like, (iv) a compound having a ester bonding, such as ethyleneglycol monoacetate, diethyleneglycol monoacetate, propyleneglycol monoacetate, dipropyleneglycol monoacetate, or the like, (v) monoalkyl ether of the polyalcohol or the compound having the ester bonding, such as monomethyl ether, monoethyl ether, monopropyl ether, monobutyl ester, (vi) a derivative of a polyalcohol such as a chemical compound having an ether bonding, such as monophenyl ether (among them, propyleneglycol monomethyl ether acetate (PGMEA), propyleneglycol monomethyl ether (PGME) are preferable), (vii) cyclic ether such as dioxane, (viii) ester such as methyl lactate, ethyl lactate (EL), methyl acetate, ethyl acetate, butyl acetate, methyl pyruvate, ethyl pyruvate, methyl methoxypropionate, ethyl ethoxypropionate, or the like, or (ix) an aromatic-based organic solvent such as anisole, ethylbenzil ether, cresylmethyl ether, diphenyl ether, dibenzyl ether, phenetol, butylphenyl ether, or the like.

A content of the entrainer is determined as appropriate in accordance with a type of the thermal polymerization inhibitor and/or the like. For example, if the content of the thermal polymerization inhibitor is 1 part by weight, then the content of the entrainer is preferably in a range from 1 part by weight or more to 50 parts by weight or less, more preferably in a range from 1 part by weight or more to 30 parts by weight or less, and most preferably in a rang from 1 part by weight or more to 15 parts by weight or less. In a case where the content of the entrainer is set within the either range, it is possible to fully dissolve the thermal polymerization inhibitor.

Another Component

The adhesive composition can further include another miscible substance in such a range that no essential feature of the present invention is impaired. For example, the adhesive composition can further include a conventional additive used to improve performance of an adhesive agent, such as an additive resin, a plasticizer, an adhesion auxiliary substance, a stabilizer, a colorant, a surfactant, and/or the like.

Method for Preparing Adhesive Composition

A method for preparing the adhesive composition of the present invention is not particularly limited and can be a conventional method. For example, the adhesive composition of the present invention can be obtained by dissolving the hydrocarbon resin and the modified elastomer in the solvent and stirring them by use of an existing stirrer device.

In a case where the thermal polymerization inhibitor is added to the adhesive composition of the present invention, it is preferable to add, to the adhesive composition of the present invention, the thermal polymerization inhibitor which is in advance dissolved in the entrainer.

Adhesive Film

The adhesive composition of the present invention can be used in various ways in accordance with uses. For example, the adhesive composition can be used in (i) a method in which the adhesive layer is formed by applying the adhesive composition in a liquid form on a work object, or (ii) a method (adhesive film method) in which the adhesive film of the present invention is adhered to a work object. According to the adhesive film method, the adhesive film of the present invention is prepared in advance by (i) forming the adhesive layer on a film, such as a flexible film, by use of the adhesive composition and (ii) drying the adhesive film thus formed.

The adhesive film of the present invention thus includes the adhesive layer which contains the adhesive composition and formed on the film.

The adhesive layer of the adhesive film may be covered with a protecting film. In this case, (i) the adhesive layer is uncovered by peeling the protecting film, (ii) the adhesive layer thus uncovered is stacked on the work object, and (iii) the film is peeled from the adhesive layer. In this way, it is possible to easily form the adhesive layer on the work object.

Therefore, by use of the adhesive film, it is possible to provide the adhesive layer whose film thickness uniformity and surface smoothness are good as compared with an adhesive layer formed by applying the adhesive composition directly on the work object.

The film thus used in preparation of the adhesive film is not particularly limited, as long as the film is a release film which can be peeled from the adhesive layer so as to allow transferring of the adhesive layer from the adhesive film onto a work surface of the work object such as a protecting substrate, a wafer, or the like. For example, the film can be a flexible film (i) which is made of a synthetic-resin film containing polyethylene terephthalate, polyethylene, polypropylene, polycarbonate, polyvinyl chloride, or the like and (ii) whose film thickness is in a range from 15 μm to 125 μm. It is preferable that the film is subjected to a release process if necessary, so as to make transferring of the adhesive layer easy.

The method in which the adhesive layer is formed on the film may be a method in which the adhesive layer is formed by applying the adhesive composition of the present invention on the film to a thickness that will be in a range from 10 μm to 1,000 μm after dried, wherein the adhesive composition of the present invention may be applied as appropriate in consideration of a desired film thickness and uniformity of the adhesive layer and the application may be performed by using a conventional method.

In a case where the protecting film is used, the protecting film is not limited as long as it can be peeled from the adhesive layer. For example, it is preferable that the protecting film is a polyethylene terephthalate film, a polypropylene film, or a polyethylene film. Further, it is preferable that the protecting film is subjected to a silicone coating process or a silicon baking process. This is because the protecting film subjected to the silicon coating process or the silicon baking process can be easily peeled from the adhesive layer. A thickness of the protecting film is preferably, but not particularly limited to, in a range from 15 μm to 125 μm. This is because in a case where the thickness of the protecting film is set within the range, it is possible to prevent the protecting film in the adhesive film from hindering a flexibility of the adhesive film.

The method in which the adhesive film is used is not limited to a particular method. For example, in a case where the protecting film is used, a thermal compression method can be used. According to the thermal compression method, the adhesive layer is (i) uncovered by peeling the protecting film, (ii) stacked on the work object, and (iii) thermally compressed to the work object by moving a heating roller on the film (a surface opposite to a surface on which the adhesive layer is formed). After peeling, it is optional to sequentially reel the protecting film in a roll form by use of a roller such as a reel roller. In this case, the protecting film can be stored and reused.

Method for Treating Substrate

The adhesive composition of the present invention can be applicable in various uses. Particularly, the adhesive composition of the present invention can be suitably used in a process of treating the substrate. In one embodiment, the method of the present invention for treating the substrate includes the steps of (i) adhering a support to the substrate via the adhesive layer made from the adhesive composition of the present invention and (ii) heat-treating the substrate, to which the support is thus adhered, at a temperature in a range from 100° C. or more to 400° C. or less.

Substrate

The substrate is not particularly limited. For example, a semiconductor wafer made from a conventional material or the like can be suitably used as the substrate.

Support

For example, the support is a member which supports the substrate during the thinning process and is adhered to the substrate by use of the adhesive composition of the present invention. In the embodiment, for example, the support contains glass or silicon and has a film thickness in a range from 500 μm to 1,000 μm.

In the embodiment, the support has a though-hole penetrating in a thickness direction of the support. By feeding the solvent in between the support and the substrate via the through-hole, it is possible to easily separate the support and the substrate.

In another embodiment, an adhesive layer and a reaction layer may be provided between a support and a substrate. The reaction layer is changed in quality by receiving light passing through the support. By changing the reaction layer in quality by entering a laser beam or the like in the reaction layer, it is possible to easily separate the support and the substrate. In the another embodiment, it is preferable to use, as the support, a support having no through-hole penetrating in a thickness direction of the support.

The reaction layer may contain, for example, a light absorbent which is broken down by a laser beam or the like. Examples of the light absorbent encompass pigments and dyes such as (i) fine particle metal power, such as graphite power, iron, aluminum, copper, nickel, cobalt, manganese, chrome, zinc, tellurium, and the like, (ii) metal oxide power such as black titanium oxide and the like, (iii) carbon black, (iv) an aromatic diamine metal complex, (v) an aliphatic diamine metal complex, (vi) an aromatic dithiol metal complex, (vii) a mercaptophenol metal complex, (viii) a squarylium compound, (ix) a cyanine series pigment, (x) a methine series pirgment, (xi) a naphthoquinone series pigment, (xii) an anthraquinone series pigment, and the like. The reaction layer can be formed by, for example, applying a mixture of the light absorbent and a binder resin onto the support. A resin having a light absorbing group can be used.

The reaction layer can be an inorganic or organic film formed by a plasma CVD method. An example of the inorganic film encompasses a metal film, whereas an example of the organic film encompasses a fluorocarbon film. The reaction film can be formed on the support by, for example, a plasma CVD method.

One Example of Process

The following describes, in detail, an example of the method of the present invention for processing the substrate. The method of the present invention is not limited to the exemplary method.

First, the adhesive composition of the present invention is applied to the substrate. Then, the adhesive composition thus applied is heated so as to form an adhesive composition film (the adhesive layer). For example, a film thickness of the adhesive layer can be, but not limited to, in a range from 15 μm or more to 130 μM or less.

A heating condition is determined based on the adhesive composition to be used. As such, the heating condition is not particularly limited. For example, the adhesive layer can be efficiently formed by gradually baking the adhesive composition while increasing a temperature to a level not lower than 50° C. but not higher than 250° C.

After this, the substrate and the support are adhered to each other via the adhesive layer. For example, the substrate and the support can be adhered to each other by (i) stacking the support on the adhesive layer formed on the substrate, and (ii) applying pressure in a vacuum condition at a high temperature (for example, 215° C.). An adhesion method is not limited to this, and a suitable adhesion method can be selected as appropriate from various conventional methods in accordance with a condition of the substrate (surface asperities, strength, and the like), compositions of the adhesive composition and the substrate, and the like.

In this way, a laminate including the substrate and the support is obtained. After this, desired processes such as a grinding (thinning) process, a through-hole electrode formation process, and the like are carried out to the laminate. In this case, the desired processes may be carried out to the laminate at a temperature in a range from 100° C. or more to 400° C. or less.

After this, the support is removed from the substrate. A removal method is not particularly limited. In a case where the support has a through-hole, as described earlier, the solvent may be fed via the through-hole to dissolve the adhesive layer so that the support can be removed from the substrate. On the other hand, in a case where the reaction layer is provided between the substrate and the support, as described earlier, light may be entered in the reaction layer to change the quality of the reaction layer, so that the support can be removed from the substrate.

Then, the solvent is fed to the adhesive layer formed on the substrate, so as to dissolve the adhesive layer. This removes the adhesive layer from the substrate. A method of feeding the solvent is not particularly limited. For example, the solvent can be sprayed by use of a two-fluid nozzle or the like.

The following describes examples so as to illustrate the embodiments of the present invention in more detail. Obviously, the present invention is not limited to the examples, and details of the present invention can be varied in many ways. Further, the present invention is not limited to the embodiments above, but may be altered by a skilled person within the scope of the claims. That is, an embodiment derived from a proper combination of technical means disclosed in different embodiments is encompassed in the technical scope of the present invention. Also, the entire contents of documents cited herein are hereby incorporated by reference.

EXAMPLES

Preparation of Adhesive Composition

Adhesive compositions made up as shown in Table 1 below were prepared.

As hydrocarbon resins of the adhesive compositions, the following (i) through (iv) were used, (i) "APEL (product name) 8008T COC, Mw=100,000, Mw/Mn=2.1, m:n=80:20 (molar ratio)" (hereinafter referred to as COC 1), (ii) "APEL (product name) 8009T COC, Mw=120,000, Mw/Mn=2.2, m:n=75:25 (molar ratio)" (hereinafter referred to as COC 2), and (iii) "APEL (product name) 6013T COC, Mw=80,000, Mw/Mn=2.0, m:n=52:48 (molar ratio)" (hereinafter referred to as COC 3), which (i) through (iii) were manufactured by MITSUI CHEMICALS Co, Ltd., and were expressed by the following chemical formula (I), and (iv) "TOPAS (product name) 8007×10, Mw=95,000, Mw/Mn=1.9, m:n=35:65 (molar ratio)" (hereinafter referred to as COC A) which was manufactured by POLYPLASTICS Co., Ltd, and was expressed by the following chemical formula (II).

[Chem. 1]

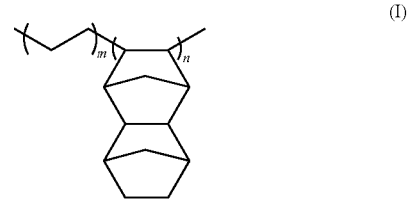

(I)

[Chem. 2]

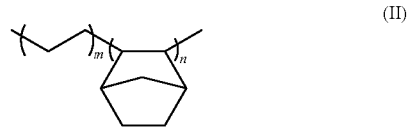

(II)

As modified elastomers of the adhesive compositions, the following (i) through (iii) were used, (i) "Tuftec (product name) MP-10" (amine modified hydrogenated SEBS) manufactured by Asahi Kasei Corporation and expressed by the following chemical formula (III), (ii) "Tuftec (product name) MP1911" (acid modified hydrogenated SEBS) manufactured by Asahi Kasei Corporation and expressed by the following chemical formula (IV), and (iii) "SEPTON (product name) HG-252" (hydroxyl group modified hydrogenated SEEPS) manufactured by KURARAY Co., Ltd. and expressed by the following formula (V). The chemical formula (IV) is shown in a simplified manner so that only a functional group-containing atom group and a main chain are shown.

[Chem. 3]

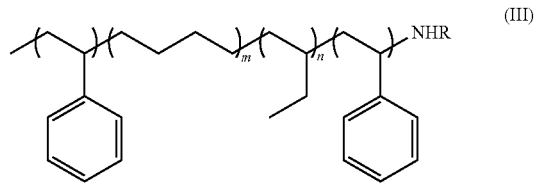

(III)

[Chem. 4]

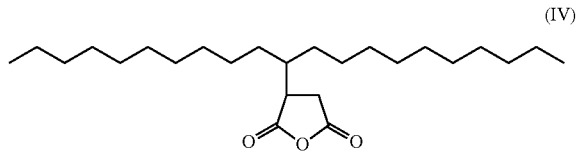

(IV)

[Chem. 5]

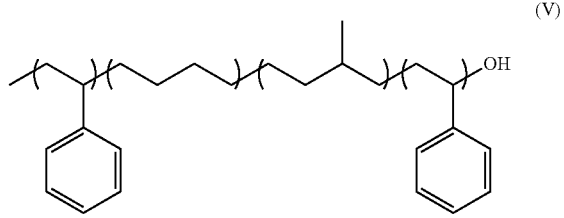
(V)

As thermal polymerization inhibitors of the adhesive compositions, "IRGANOX (product name) 1010", which was manufactured by BASF Co., Ltd., was used. As main solvents of the adhesive compositions, decahydronaphthalene expressed by the following chemical formula (VI) was used. As entrainers of the adhesive compositions, butyl acetate was used.

[Chem. 6]

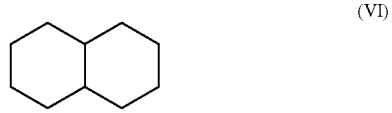
(VI)

In each of Examples 1 through 14, (i) a mixture of the hydrocarbon resin and the modified elastomer, which are shown in Table 1 below, were dissolved in the main solvent in such an amount that a concentration of the hydrocarbon resin and the modified elastomer in a resultant solution was 25% by weight, (ii) the thermal polymerization inhibitor (antioxidant) was dissolved in the entrainer in such an amount that a concentration of the thermal polymerization inhibitor in a resultant solvent was 5% by weight, and (iii) 1 part by weight of the solution of the thermal polymerization inhibitor was added to and mixed with the solution of the mixture of the hydrocarbon resin and the modified elastomer, where the hydrocarbon resin is 100 parts by weight. By this, the adhesive compositions of Examples 1 through 14 were obtained.

In each of Comparative Examples 1 through 3, (i) the hydrocarbon resin shown in Table 1 below was dissolved in the main solvent in such an amount that a concentration of the hydrocarbon resin in a resultant solution was 25% by weight, (ii) the thermal polymerization inhibitor (antioxidant) was dissolved in the entrainer in such an amount that a concentration of the thermal polymerization inhibitor in a resultant solvent was 5% by weight, and (iii) 1 part by weight of the solution of the thermal polymerization inhibitor was added to and mixed with the solution of the hydrocarbon resin, where the hydrocarbon resin is 100 parts by weight. By this, the adhesive compositions of Comparative Examples 1 through 3 were obtained.

In Table 1, a parenthesized numeric value for each modified elastomer indicates a content of that modified elastomer, in part by weight, with respect to 100 parts by weight of the hydrocarbon resin, and a parenthesized numeric value for each thermal polymerization inhibitor indicates a content of that thermal polymerization inhibitor, in part by weight, with respect to 100 parts by weight of the hydrocarbon resin, whereas a parenthesized numeric value for each entrainer indicates a content of that entrainer, in percent by volume, with respect to a combined volume of the solvents and the entrainer.

TABLE 1

| | | Example 1 | Example 2 | Example 3 | Example 4 | Example 5 | Example 6 |
|---|---|---|---|---|---|---|---|
| hydrocarbon resin | | COC 1 | COC 1 | COC 1 | COC 1 | COC 2 | COC 2 |
| modified elastomer | | MP-10 (1) | MP-10 (2.4) | M1911 (1) | M1911 (2.4) | MP-10 (2.4) | M1911 (2.4) |
| thermal polymerization inhibitor | | IRGANOX 1010 (1) | IRGANOX 1010 (1) | IRGANOX 1010 (1) | IRGANOX 1010 (1) | IRGANOX 1010 (1) | IRGANOX 1010 (1) |
| main solvent | | decahydro-naphthalene | decahydro-naphthalene | decahydro-naphthalene | decahydro-naphthalene | decahydro-naphthalene | decahydro-naphthalene |
| entrainer | | butyl acetate (15%) | butyl acetate (15%) | butyl acetate (15%) | butyl acetate (15%) | butyl acetate (15%) | butyl acetate (15%) |
| adhesive layer/substrate interfacial peeling | 20 μm | A* | A | A | A | A | A |
| | 50 μm | A | A | A | A | A | A |
| | 100 μm | A | A | A | A | A | A |
| adhesive strength g/cm | | 50 | 150 | 40 | 100 | 140 | 95 |

| | | Example 7 | Example 8 | Example 9 | Example 10 | Example 11 | Example 12 |
|---|---|---|---|---|---|---|---|
| hydrocarbon resin | | COC 3 | COC 3 | COC 1 | COC 1 | COC A | COC A |
| modified elastomer | | MP-10 (2.4) | M1911 (2.4) | MP-10 (10) | M1911 (10) | HG-252 (1) | HG-252 (2.4) |
| thermal polymerization inhibitor | | IRGANOX 1010 (1) | IRGANOX 1010 (1) | IRGANOX 1010 (1) | IRGANOX 1010 (1) | IRGANOX 1010 (1) | IRGANOX 1010 (1) |
| main solvent | | decahydro-naphthalene | decahydro-naphthalene | decahydro-naphthalene | decahydro-naphthalene | decahydro-naphthalene | decahydro-naphthalene |
| entrainer | | butyl acetate (15%) | butyl acetate (15%) | butyl acetate (15%) | butyl acetate (15%) | butyl acetate (15%) | butyl acetate (15%) |
| adhesive layer/substrate interfacial peeling | 20 μm | A | A | A | A | A | A |
| | 50 μm | A | A | A | A | A | A |
| | 100 μm | A | A | A | A | A | A |
| adhesive strength g/cm | | 120 | 80 | 300 | 150 | 35 | 130 |

TABLE 1-continued

|  |  | Example 13 | Example 14 | Comparative Example 1 | Comparative Example 2 | Comparative Example 3 |
|---|---|---|---|---|---|---|
| hydrocarbon resin | | COC 1 | COC 1 | COC A | COC 1 | COC 2 |
| modified elastomer | | HG-252 (1) | HG-252 (2.4) | | | |
| thermal polymerization inhibitor | | IRGANOX 1010 (1) | IRGANOX 1010 (1) | IRGANOX 1010 (1) | IRGANOX 1010 (1) | IRGANOX 1010 (1) |
| main solvent | | decahydro-naphthalene | decahydro-naphthalene | decahydro-naphthalene | decahydro-naphthalene | decahydro-naphthalene |
| entrainer | | butyl acetate (15%) | butyl acetate (15%) | | butyl acetate (15%) | butyl acetate (15%) |
| adhesive layer/substrate interfacial peeling | 20 μm | A | A | | A | A |
| | 50 μm | A | A | B* | B | B |
| | 100 μm | A | A | B | B | B |
| adhesive strength g/cm | | 40 | 140 | <10 | <10 | <10 |

*"A" indicates that there is no adhesive layer/substrate interfacial peeling, whereas "B" indicates that there is adhesive layer/substrate interfacial peeling.

Evaluation of Flexibility and Adhesiveness
Manufacturing of Laminate

Each of the adhesive compositions of Examples 1 through 14 and Comparative Examples 1 through 3 was spin-applied to a semiconductor wafer substrate, and baked at 100° C., 160° C., and 220° C. sequentially for about 5 minutes each. In this way, the adhesive layer was formed on the semiconductor wafer substrate. Note that the adhesive layer thus formed had a film thickness of 20 μm, 50 μm, or 100 μm.

After this, the semiconductor wafer substrate on which the adhesive layer was formed was adhered, at 200° C., to a support including the reaction layer made of the fluorocarbon film. This produced the laminate. Note that the fluorocarbon film was formed on a planar glass support of a thickness of 0.7 mm, by use of a $C_4F_8$ gas and a plasma CVD device. This produced the support in which the reaction layer (film thickness: 1 μm) was formed.

(Thinning of Laminate, and High-Temperature Treatment of Laminate)

The laminate thus formed was subjected to predetermined treatments including wafer thinning, a photolithography process, and the like. Then, a laser beam having a wavelength of 532 nm was irradiated to change the reaction layer of the laminate in quality, so that the laminate was removed from the support.

In this case, no peeling of the adhesive agent in an interface of the adhesive layer and the substrate was observed in Examples 1 through 14.

In contrast, in Comparative. Examples 1 through 3, in a case where the adhesive layer had the film thickness of 50 μm or more, peeling of the adhesive agent occurred in the interface of the adhesive layer and the substrate. Further, foam was formed during a high-temperature vacuum process so that there was a risk of wafer chipping.

Washing of Adhesive Layer

Thereafter, the semiconductor wafer substrate from which the support was removed was spray-washed by use of p-mentane. By the spray washing, the adhesive layer was removed from the substrate. As a result, no residual adhesive layer was observed on the substrate, and the laminate was removed from the substrate without any problem.

(Measuring of Si Surface Adhesive Strength (90° Peeling Removal Strength))

The adhesive layer thus formed on the substrate was cut into strip-shaped pieces having a width of 10 mm by use of a cutter. Then, the adhesive layers were removed from the substrate by pulling the adhesive layers from the substrate in a direction vertical to the substrate at a speed of 200 mm/s so that a peeling angle (angle between the adhesive layer and the substrate) was constantly 90°. While the strip-shaped pieces of the adhesive layer were being pulled, an adhesive strength was measured by measuring a peeling strength (g/cm). In this case, if the adhesive strength was 20 g/cm or more, it can be said that a sufficient adhesive was obtained.

As shown in Table 1, the sufficient adhesivenesses were obtained in all of Examples 1 through 14. In contrast, no sufficient adhesiveness was obtained in Comparative Examples 1 through 3.

Industrial Applicability

The adhesive composition of the present invention, the adhesive film of the present invention, the method of the present invention for treating the substrate can be, for example, suitably used in a process of manufacturing a fine semiconductor device.

What is claimed is:

1. An adhesive composition comprising:
   a hydrocarbon resin;
   a modified elastomer that is bonded with at least one atom group that is a functional group-containing atom group; and
   a solvent
   wherein the solvent contains a condensed polycyclic hydrocarbon.

2. The adhesive composition of claim 1, wherein the modified elastomer is included in such an amount that the content of the modified elastomer is in a range from 0.1 part by weight or more to 20 parts by weight or less with respect to 100 parts by weight of the hydrocarbon resin.

3. The adhesive composition of claim 1, wherein the functional group-containing atom group is an atom group including one or more functional groups selected from the group consisting of an amino group, an acid anhydride group, an imido group, a urethane group, an epoxy group, an imino group, a hydroxyl group, a carboxyl group, a silanol group, and an alkoxysilane group.

4. The adhesive composition of claim 1, wherein the modified elastomer is such that the functional group-containing atom group is bonded to a hydrogenate of a block copolymer of a vinyl aromatic hydrocarbon and a conjugated diene.

5. An adhesive composition comprising:
   a hydrocarbon resin;
   a modified elastomer that is bonded with at least one atom group that is a functional group-containing atom group; and
   a solvent,
   wherein the hydrocarbon resin is a cycloolefin polymer.

6. The adhesive composition as set forth in claim 5, wherein the modified elastomer is included in such an amount that the content of the modified elastomer is in a range from 0.1 part by weight or more to 20 parts by weight or less with respect to 100 parts by weight of the hydrocarbon resin.

7. The adhesive composition as set forth in claim 5, wherein the functional group-containing atom group is an atom group including one or more functional groups selected from the group consisting of an amino group, an acid anhydride group, an imido group, a urethane group, an epoxy group, an imino group, a hydroxyl group, a carboxyl group, a silanol group, and an alkoxysilane group.

8. The adhesive composition as set forth in claim 5, wherein the modified elastomer is such that the at least one atom group that is a functional group-containing atom group is bonded to a hydrogenerate of a block copolymer of a vinyl aromatic hydrocarbon and a conjugated diene.

9. An adhesive composition comprising:
a hydrocarbon resin;
a modified elastomer that is bonded with at least one atom group that is a functional group-containing atom group; and
a solvent,
wherein the functional group-containing atom group is an atom group including one or more functional groups selected from the group consisting of an amino group, an imido group, a urethane group, an epoxy group, an imino group, a hydroxyl group, a carboxyl group, a silanol group, and an alkoxysilane group.

10. The adhesive composition of claim 9, wherein the modified elastomer is included in such an amount that the content of the modified elastomer is in a range from 0.1 part by weight or more to 20 parts by weight or less with respect to 100 parts by weight of the hydrocarbon resin.

11. The adhesive composition of claim 9, wherein the modified elastomer is such that the at least one atom group that is a functional group-containing atom group is bonded to a hydrogenerate of a block copolymer of a vinyl aromatic hydrocarbon and a conjugated diene.

12. An adhesive film comprising:
a film; and
an adhesive layer on the film, the adhesive layer comprising an adhesive of claim 1 on the film.

13. An adhesive film comprising:
a film; and
an adhesive layer on the film, the adhesive layer comprising the adhesive composition of claim 5.

14. An adhesive film comprising:
a film; and
an adhesive layer on the film, wherein the adhesive layer comprises the adhesive composition of claim 9.

15. A method for treating a substrate, comprising:
adhering a support to a substrate via an adhesive layer comprising the adhesive composition of claim 1; and
performing heat treatment in which the substrate, to which the support is adhered, is heated at a temperature in a range from 100° C. or more to 400° C. or less.

16. A method for treating a substrate, comprising:
adhering a support to a substrate via an adhesive layer comprising the adhesive composition of claim 5; and
performing heat treatment in which the substrate, to which the support is adhered, is heated at a temperature in a range from 100° C. or more to 400° C. or less.

17. A method for treating a substrate, comprising:
adhering a support to a substrate via an adhesive layer comprising the adhesive composition of claim 9; and
performing heat treatment in which the substrate, to which the support is adhered, is heated at a temperature in a range from 100° C. or more to 400° C. or less.

* * * * *